United States Patent [19]

Weisert et al.

[11] Patent Number: 4,882,823
[45] Date of Patent: Nov. 28, 1989

[54] SUPERPLASTIC FORMING DIFFUSION BONDING PROCESS

[75] Inventors: Edward D. Weisert; John R. Fischer, both of San Carlos; William L. McCauley, Dublin, all of Calif.

[73] Assignee: Ontario Technologies Corp., Menlo Park, Calif.

[21] Appl. No.: 149,216

[22] Filed: Jan. 27, 1988

[51] Int. Cl.⁴ .............................................. B23K 31/02
[52] U.S. Cl. ...................................... 29/6.1; 29/23.5; 29/156.8 R; 29/156.8 H; 29/421.1; 228/157; 228/190
[58] Field of Search ................... 29/6.1, 23.5, 156.8 R, 29/156.8 H, 156.8 B, 421 R; 228/44.3, 212, 243, 157, 193, 157, 190

[56] References Cited

U.S. PATENT DOCUMENTS

| | | | |
|---|---|---|---|
| 2,766,514 | 10/1956 | Adams | 228/157 X |
| 4,292,375 | 1/1981 | Ko | 228/157 X |
| 4,331,284 | 5/1982 | Schultz et al. | 228/157 X |
| 4,406,393 | 9/1983 | Ascani, Jr. | 228/157 |
| 4,483,478 | 11/1984 | Schultz | 228/157 |
| 4,526,312 | 7/1985 | Goss et al. | 228/157 |

Primary Examiner—Timothy V. Eley
Attorney, Agent, or Firm—Fliesler, Dubb, Meyer & Lovejoy

[57] ABSTRACT

A method is set forth of forming a hollow structure having a varying mass distribution. Two sheets of a diffusion bondable and superplastic formable material are formed with one flat surface and an opposite surface contoured to have a selected mass distribution. A stop-off material is applied between selected non-peripheral portions of each of the flat surfaces whereat diffusion bonding is to be prevented and superplastic forming is to be required. An intermediate flat core sheet may also be present. The flat surfaces are positioned in abutting relation to each other or to the intermediate flat core sheet. The sheets are subjected to diffusion bonding conditions. The sheets are superplastically formed to expand them apart against a die. The invention also provides a method of preinflating contoured sheets prior to superplastically forming them to avoid truss core rupture. Hollow aircraft engine components are formed by the methods.

20 Claims, 4 Drawing Sheets

SUPERPLASTIC FORMING DIFFUSION BONDING PROCESS

TECHNICAL FIELD

The present invention relates to a process for diffusion bonding and superplastic forming hollow components such as aircraft engine components, for example, gas turbine compressor fan blades.

BACKGROUND OF THE INVENTION

Superplastic forming/diffusion bonding (SPF/DB) technology has emerged for the production of airframe components utilizing flat metal sheets in the fabrication process. Airframe components require only the simplest of skin thickness variations. Typically, such variations are whatever results from forming a nominally uniform thickness sheet into a particular contour. In some cases the thickness may be increased, locally, by the bonding of doublers or other details. Limited efforts have also been made to achieve different thickness level in part by chemical milling selected areas uniformly or with a taper prior to processing. However, the process is still essentially the bonding together of thin flat sheets.

The application of SPF/DB processing to produce aircraft engine components was initiated about 1976 as an extension of the airframe technology. Many aircraft gas turbine applications, for example, compressor fan blading, require that the mass distribution, that is the thickness, of the component structure vary extensively as a function of location on the part. Using prior art SPF/DB processes, that is, starting with flat rolled sheets as the processed raw material, it is possible to achieve complex mass distribution within a hollow structural component. This is done by cutting sheet details to diverse plan forms so that when properly stacked together they comprise a multi-layered, contoured aggregate that may be diffusion bonded into a monolithic mass that approximates the desired distribution of mass in the component. For example, early developmental application of SPF/DB to fan blades has been accomplished by this extension of the airframe SPF/DB technology.

A number of problems exist with applying the prior art multi-layer SPF/DB technology to making hollow components having mass distributions which vary extensively as a function of location on the part. It has been found that in order to approximate the desired mass distribution in a typical hollow fan blade as many as eighty (80) differently shaped details have to be cut from sheet stock, stacked together and consolidated. This requires large expenditures of labor and is accordingly quite expensive. Flat rolled sheet has a typical thickness tolerance of ±about 10%. Thus, when numerous sheet details are stacked together the aggregate thickness is difficult to control in a reproducible manner. This is of special concern in the case of rotating components, such as fan blades, where moment weight control must be at a high level. An assembly consisting of stacked sheet details provides only an approximation of the desired mass distribution. To further approach that distribution the prior art method has required that deformation of the bonded details occurs in closing of the final tooling to move mass from over-thick regions to under-thick regions. Prediction of the effectiveness of this is difficult at best whereby considerable trial and error is involved. Control of repeatability is difficult as is inspection to maximize repeatability.

The edges of sheet details, especially ones of heavier gauge, create a step type void in the as-bonded workpiece that may not completely close up as a result of the tool closing deformation. These voids represent an undesirable internal defect. This effect can be mitigated by bevelling of individual details to feather edges, but only at considerable labor costs, and with added difficulties and without complete resolution of the defect problem in a readily inspectable manner.

In the case of details that do not extend into trim areas, but terminate within the part itself, such details must be spot welded in their assembly stack position. The weld nuggets are then buried within the component leading to a questionable effect on component integrity.

Another problem also exists in superplastic forming to form hollow components having mass distributions which vary extensively as a function of location on the part. This problem is that in order for the forming gas to penetrate the stopoff areas in a diffusion bonded sandwich structure the unbonded portions of the face sheets must sequentially expand to arch slightly starting nearest the gas source. Arching of each successive section is initiated by arching of the previous adjacent section. If the thickness of the face sheets increases away from the gas source there is increasing resistance to inflation until the pressure required to provide inflation becomes so high that when opening occurs the strain rate is so high that rupture occurs from the intermediate core sheet.

The present invention is directed to overcoming one or more of the problems as set forth above.

DISCLOSURE OF INVENTION

In accordance with an embodiment of the present invention a method is set forth of forming a hollow structure having a varying mass distribution. The method comprises forming a first sheet of a diffusion bondable and superplastically formable material with one flat surface and with an opposite surface contoured to have a first selected mass distribution. A second sheet is formed of a diffusion bondable and superplastically formable material with one flat surface and with an opposite surface contoured to have a second selected mass distribution. A stop-off material is applied between selected non-peripheral portions of each of the flat surfaces whereat diffusion bonding is to be prevented and superplastic forming is to be required. The flat surfaces are positioned in abutting relation to an intermediate flat core sheet. The sheets are subjected to diffusion bonding conditions to thereby bond the flat surfaces to the core sheet other than where the stop-off material was applied. The sheets are preinflated against a first die sufficiently to increase the average thickness of the diffusion bonded structure no more than about 150 mils. The sheets are therafter subjected to superplastic forming conditions and thereby expanded against a second die.

In accordance with another embodiment of the present invention a method is set forth of forming a hollow structure having a varying mass distribution. The method comprises forming a first sheet of a diffusion bondable and superplastically formable material with one flat surface and with an opposite surface contoured to have a first selected mass distribution. A second sheet is formed of a diffusion bondable and superplastically formable material with one flat surface and with an opposite surface contoured to have a second selected mass distribution. A stop-off material is applied between selected non-peripheral portions of each of the flat surfaces whereat diffusion bonding is to be prevented and superplastic forming is to be required. The flat surfaces are positioned in abutting relation to one another or to an intermediate flat core sheet. The sheets are subjected to diffusion bonding conditions to thereby bond the flat surfaces to each other or to the core sheet other than where the stop off material was applied. The sheets are subjected to superplastic forming conditions and thereby expanded against a die.

A hollow structure formed in accordance with the method of the present invention forms yet another embodiment of the invention.

In accordance with the present invention a hollow structure having a varying mass distribution can be readily formed with high reproducibility and with the abovementioned problems of the prior art all being overcome.

BRIEF DESCRIPTION OF DRAWINGS

The invention will be better understood by reference to the figures of the drawings wherein like numbers denote like parts throughout and wherein.

BEST MODE FOR CARRYING OUT INVENTION

Figure 1:
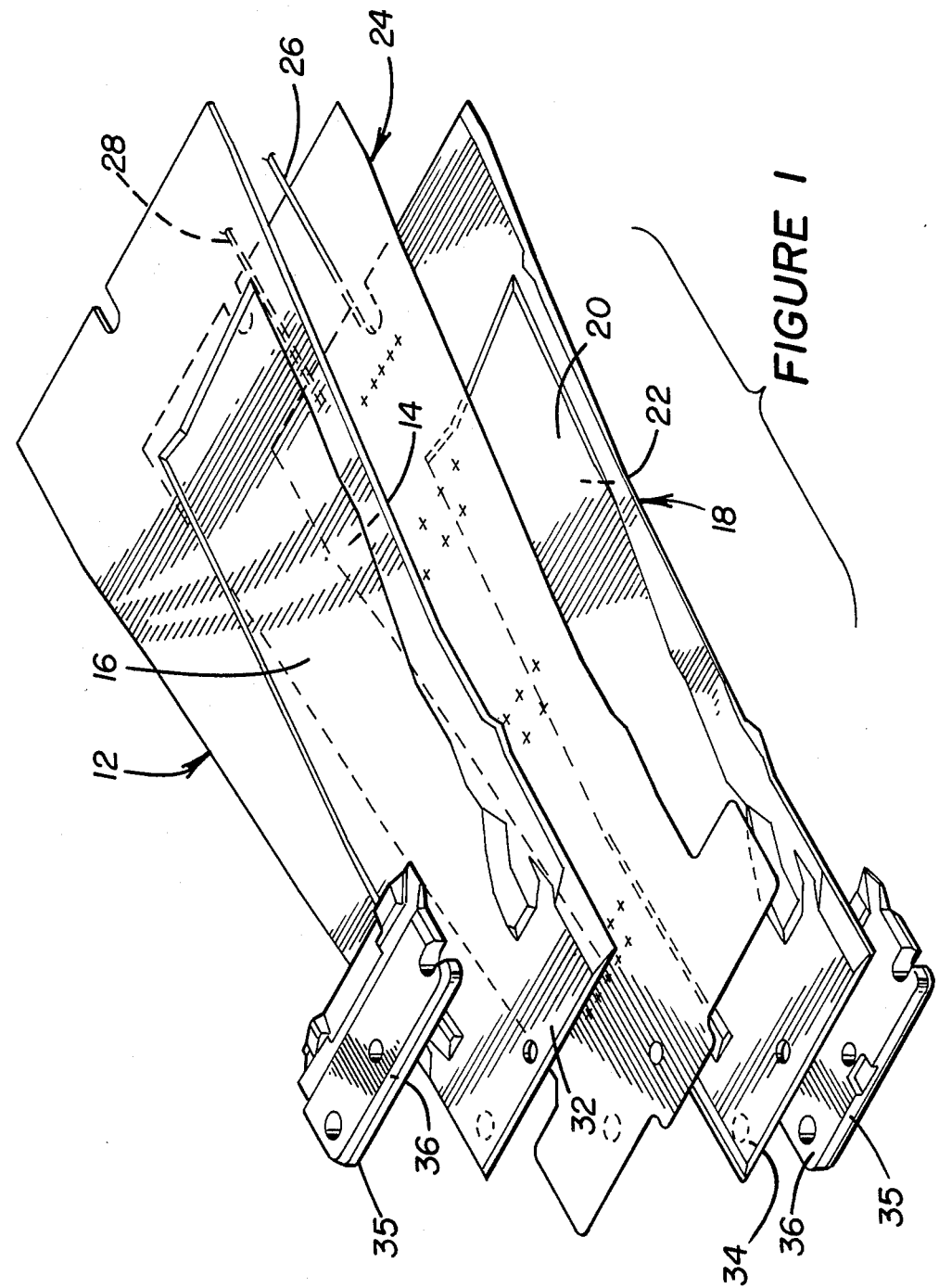
FIG. 1 illustrates, in side perspective from above, parts ready for processing in accordance a method of the present invention.

A number of alloys exhibit superplasticity and are capable of being subjected to superplastic forming to produce parts of predetermined shapes. Superplasticity is the capability of a material to develop unusually high tensile elongation with reduced tendency toward local necking during deformation. Superplastic behavior also enhances formability under compressive strain conditions. However, this invention is particularly concerned with superplastic metals which are subject to contamination of surface integrity at forming temperatures. These are termed "reactive" metals. This term includes, for example, alloys of titanium and zirconium.

Diffusion bonding refers to the solid-state, metallurgical joining of surfaces of similar or dissimilar metals by applying heat and pressure for a time duration so as to effect intimate surface contact and cause co-mingling of atoms at the joint interface.

In order to produce structures having interior chambers by SPF/DB, metal blanks, preferably of a titanium alloy, and which can be metal matrix composites, i.e., which can have fibers such as SiC, B or the like dispersed in a metal matrix, are joined at selected areas by diffusion bonding at elevated temperatures and pressures and are then subjected to superplastic forming to form the desired structure. The metal blanks are first treated at selected areas with a stop-off material, such as yttria, boron nitride, graphite or alumina, to prevent bonding at such treated areas during diffusion bonding. During superplastic forming the metal blanks are expanded at the treated (unbonded) areas and brought into contact with shaping members by increasing the internal pressure, preferably with inert gas, thus forming an expanded structure of a desired shape, essentially in a single operation. For such superplastic forming to occur, gas must penetrate the entire interior network of unbonded (stopped off) areas.

The present invention relates to forming a hollow structure 10 (FIG. 4) having a varying mass distribution. The method itself consists of diffusion bonding followed by superplastic forming. The diffusion bonding and superplastic forming are carried out under conventional conditions. These, when of preferred Ti-6A1-4V material, may vary somewhat but, for superplastic forming, are generally temperatures in about the range 1450° F 1450° F-1750° F, preferably, 1650° F-1750° F at internal pressures from about 25-300 psi. The superplastic forming is carried out in a die to which the exterior surface of the hollow structure 10 conforms following the superplastic forming operation. Somewhat higher external pressures are generally used to accomplish the diffusion bonding; for example, pressures from 100 psi to about 3000 psi, usually from about 150 psi to about 600 psi, are common. Generally it is preferred that gas pressure be used for the diffusion bonding. The diffusion bonding time can be from about 30 minutes on up, sometimes requiring as much as 15 hours for some materials.

In accordance with the present invention (see FIG. 4) a first sheet 12 of a diffusion bondable and superplastically formable material is formed with one flat surface 14 and an opposite surface 16 contoured to have a first selected mass distribution. The mass distribution of the opposite surface 16 is determined by the desired mass distribution of the desired final hollow structure 10. Thus, the opposite surface 16 is contoured so as to provide the desired mass distribution for the first sheet 12 when it forms part of the hollow structure 10.

A second sheet 18 is formed of SPF/DB material with one flat surface 20 and an opposite surface 22 contoured to have a second selected mass distribution (which may, or may not, be related to the first mass distribution. The contouring of the opposite surface 22 is such as to provide the desired mass distribution for the second sheet 18 in the final resulting hollow structure 10.

Figure 2A:
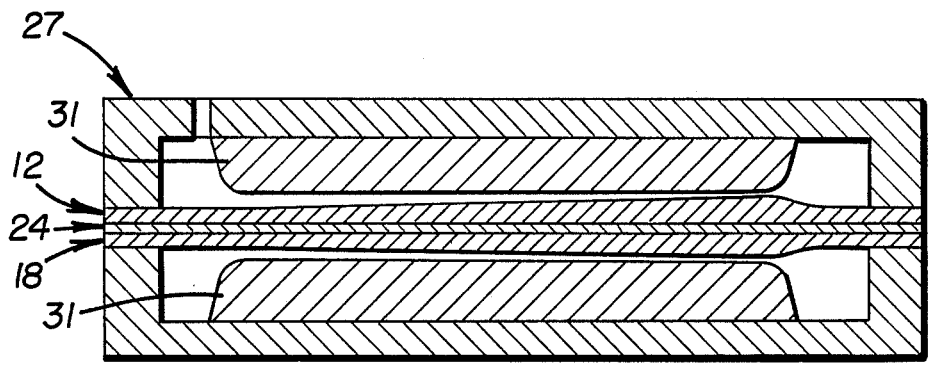
FIGS. 2A, 2B and 2C illustrate, in side section, the diffusion bonding and preinflation steps in production of a finished hollow structure produced in accordance with an embodiment of the present invention.
Figure 2B:
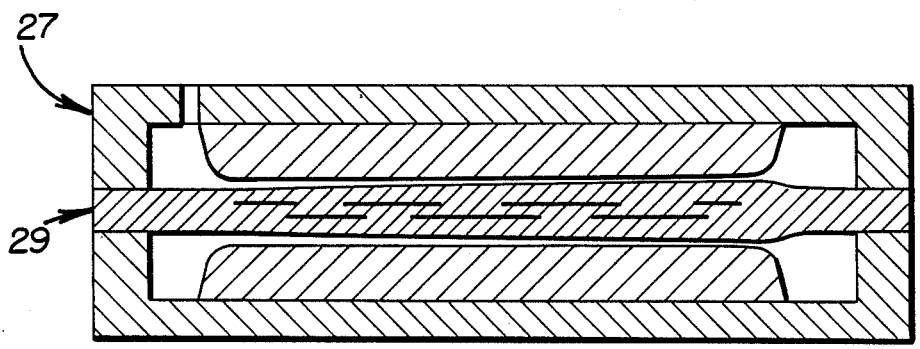
Figure 2C:
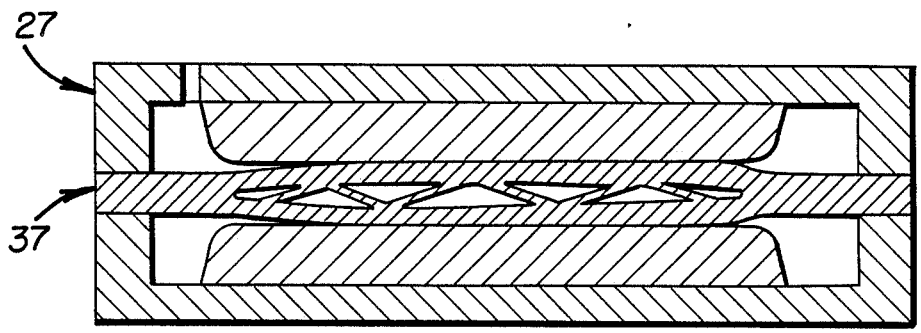

A stop-off material as discussed above is applied either between selected non-peripheral portions 19 (FIG. 2A) of each of the flat surfaces 14 and 20 whereat diffusion bonding is to be prevented and superplastic forming is to be required, or, between the flat surfaces 14 and 20 and the opposite flat sides of an intermediate flat core sheet 24 which is used when an internal truss core 25 (FIGS. 2B and 3) is desired (as is usually the case). The flat surfaces 14 and 20 are positioned in abutting relation to each other or to the opposite flat sides of the intermediate flat core sheet 24. The sheets 12,18 and 24 are subjected to diffusion bonding conditions in appropriate tooling 27 to thereby bond the flat surfaces 14 and 20 to each other or to the core sheet 24 other than where the stop-off material was applied and to thereby form a diffusion bonded sandwich 29 (FIGS. 2B).

When the flat core sheet 24 is present the face sheets 12 and 18 are, in accordance with one embodiment of the invention (see FIG. 2B), preinflated away from the core sheet 24 under superplastic forming conditions sufficiently to provide a small gap between the face sheets 12 and 18 and the core sheet 24 at the stopped off areas. This is needed even if the face sheets 12 and 18 start off as sandwiches of many thin sheets that are united during the diffusion bonding operation. Generally, the diffusion bonded sandwich 29 of the face sheets 12 and 18 with the core sheet 24 is preinflated against a first die 31 sufficiently to increase the average thickness of the diffusion bonded sandwich 29 between about 5 mils (thousandths of an inch) and about 150 mils, usually between about 10 mils and about 100 mils, suitably between about 15 mils and about 70 mils and preferably between about 20 mils and about 50 mils to form a preinflated structure 37. The first die 31 may be part of the same tooling 27 in which the diffusion bonding is carried out. This step is important so as to prevent rupturing of the truss core during later superplastic forming. The rupturing problem occurs because of the different mass distribution (thickness) of the sheets 12,18. In order for the forming gas, e.g., argon to penetrate the stop-off areas in the diffusion bonded workpiece the unbonded portions of the face sheets 12,18 must sequentially expand to arch slightly starting nearest the gas source (inflation tubes 26,28 in FIG. 1 in the embodiment illustrated) and progressing away therefrom. For each successive section the arching is initiated by the arching of the adjacent preceeding section. In structures having uniform thickness this proceeds uniformly and rapidly. However, in structures having, for example, increasing thickness proceeding away from the gas source the unopened areas progressively increase resistance to inflation whereby higher and higher inflation pressures are required until the pressure level becomes so high that, when opening occurs, there is excessive applied stress and a strain rate is reached which causes the truss core to rupture. By utilizing preinflation in accordance with the present invention the truss core is prevented from being strained sufficiently to damage it. And, when a following superplastic forming step is carried out wherein the sandwich expands considerably more, the entire unbonded area is in flow communication with the gas source whereby excessive strain rates do not develop and rupturing is thereby prevented.

In certain instances, for example, in the case of gas turbine fan blades, the diffusion bonded structure can by contoured to a desired shape prior to the superplastic forming step. This can be accomplished, for example, by grasping the portion to the structure which will form the base or root of the blade and also grasping the portion of the structure which will form the edge furthest removed from the base. The former can be held in place while the latter is twisted sufficiently to provide a desired shape for the ultimately produced fan blade.

Figure 3A:
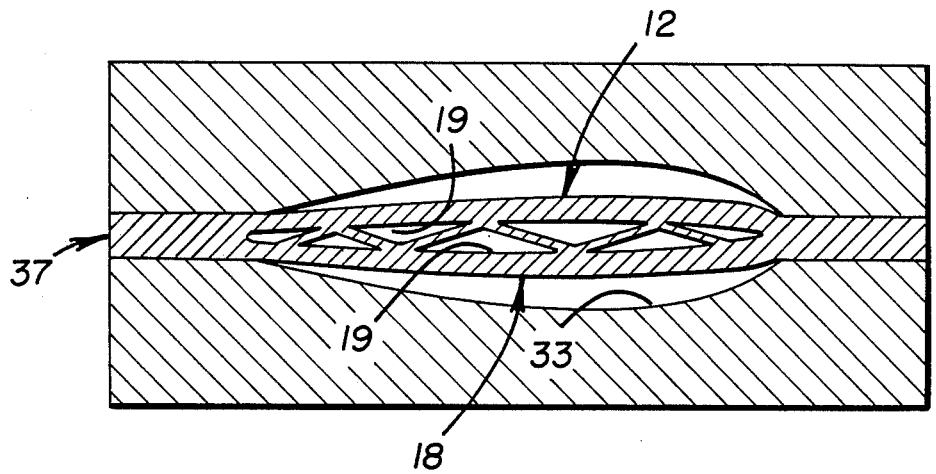
FIGS. 3A and 3B illustrate, in side section, the superplastic forming step in production of a finished hollow in accordance with an embodiment of the invention.
Figure 3B:
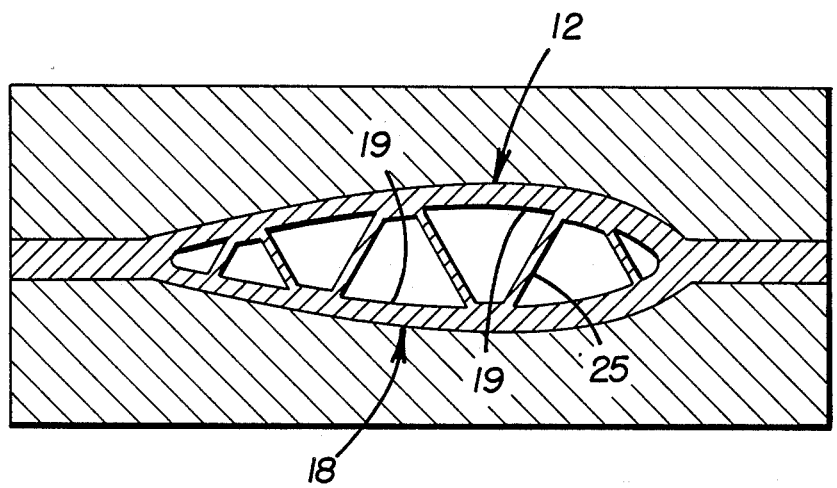

The sheets 12 and 18, and 24 when present, are subjected to superplastic forming conditions (see FIGS. 3A, 3B) and thereby expanded apart against an appropriate second die 33. The superplastic forming step follows the twisting step if the diffusion bonded structure undergoes a twisting step. The inflation tubes 26,28 (FIG. 1) can be used to provide the needed internal pressure to accomplish the superplastic forming. FIGS. 3A and 3B illustrate the diffusion bonded sandwich 29, after it has been preinflated, being superplastically formed against the second die 33.

In accordance with one embodiment of the method of the present invention at least one of the first and second sheets 12 and 18 is itself formed by hot forming either of the opposite surface 16 or 22 thereof against a die or of the surface 14 or 20 against a mandrel and then machining the respective surface 14 or 20 thereof until it is flat. The hot forming can be by application of gas pressure (superplastic forming) or by the use of a punch or of the mandrel. It is preferred that both the first sheet 12 and the second sheet 18 be formed in this manner. The respective contoured sides 16 and 22 are generally protected as by being securely retained in a die while the respective one surface 14 or 20 is being machined flat.

In accordance with another embodiment of the method of the present invention at least one of the first and second sheets 12 and 18 is formed from a relatively thick sheet having the one flat surface 14 or 20 by maintaining the one flat surface 14 or 20 thereof flat while mechanically machining the opposite surface 16 or 22 thereof to contour it. The mechanical machining can be carried out by any convenient technique, for example, CNC (computer numerically controlled) machining, tracer milling, or the like. Both the first and second sheets 12 and 18 can be formed in this manner, if desired.

Still another method of forming one or more of the first and second sheets 12 and 18 is by starting with a relatively thick sheet having the one flat surface 14 or 20 by maintaining the one surface 14 or 20 thereof flat while chemically milling, electrochemically machining (ECM) or electrically discharge machining (EDM) of the opposite surface 16 or 22 thereof to contour it. Both the first and second sheets 12 and 18 can be formed in this manner.

Figure 4:
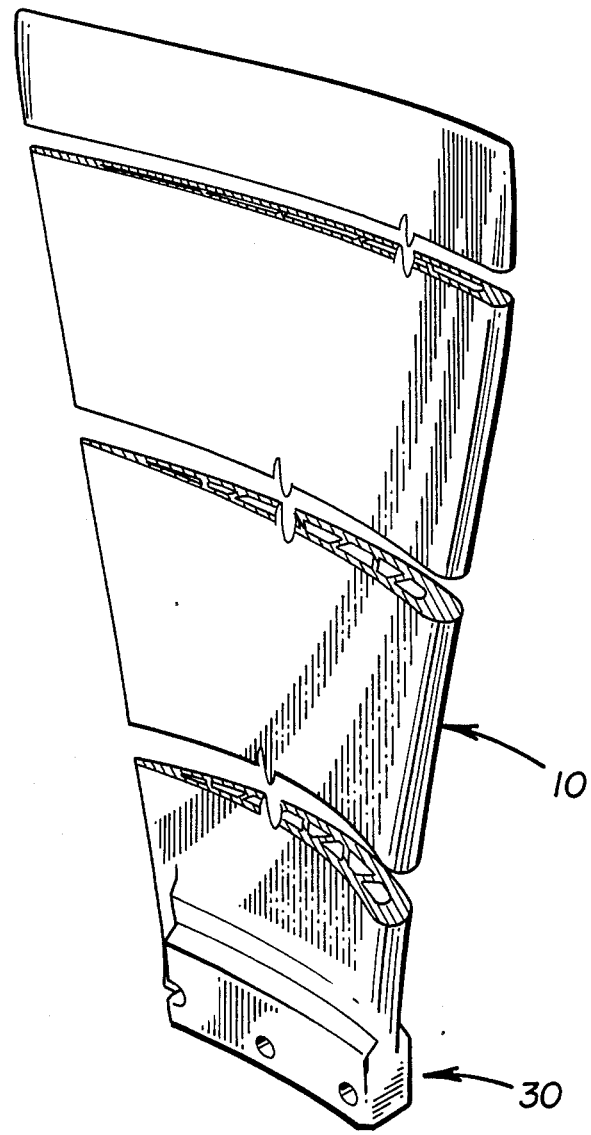
FIG. 4 illustrates, in partially cut away perspective, a finished hollow structure produced in accordance with an embodiment of the present invention.

In some instances it may be desirable to add an additional structural member for adjusting weight distribution of the hollow structure 10 (see FIGS. 1 and 4). For example, if one is making a hollow fan blade 10 it may be desirable to increase the thickness at the root section 30 of the blade 10. While one could simply start with a very thick plate initially this would be quite wasteful of material and would make the forming more difficult. Also, it is very difficult to get thick plates with a suitable microstructure for superplastic forming. Accordingly, in some instances it is desirable to form a flat area 32 or 34 on the contoured opposite surface 16 or 22 of at least one of the first and second sheets 12 and 18 prior to subjecting the sheets 12 and 18 to diffusion bonding conditions. An additional structural member 35 has a flat surface 36 thereof abutted to the flat area 32 whereby the flat area 32 is diffusion bonded to the flat surface 36 of the additional structural member 35 during the subjecting of the sheets to the diffusion bonding conditions. Generally, as illustrated, a pair of such additional structural members 35 will be utilized to provide desired mass distribution in the case of a fan blade. However, in other instances only a single such additional structural member 35 may be desirable.

In accordance with an embodiment of the present invention a hollow structure 10, as seen in FIG. 4, can be formulated having a significantly varying mass distribution.

INDUSTRIAL APPLICABILITY

In accordance with the present invention a method is set forth of forming a hollow structure 10 having a varying mass distribution by an SPF/DB process. The process is useful for forming aircraft engine components such as compressor fan blades.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

We claim:

1. A method of forming a hollow structure having a varying mass distribution, comprising:
   forming a first unitary sheet of a diffusion bondable and superplastically formable material with one flat surface and an opposite surface contoured to have a first selected non-uniform mass distribution;
   forming a second sheet of a superplastically formable material that is diffusion bondable to said first sheet with one flat surface and an opposite surface contoured to have a second selected mass distribution, said first and second mass distributions being such as to provide said varying mass distribution for said hollow structure;
   positioning each of said flat surfaces in abutting relation to a respective one of one another and a respective one of a pair of oppositely facing flat surfaces of an intermediate flat core sheet formed of a material that is diffusion bondable to said first and second sheets and with a stop-off material between selected non-peripheral portions of each of abutting said flat surfaces whereat diffusion bonding is to be prevented and superplastic forming is to be required;
   subjecting said sheets to diffusion bonding conditions to thereby bond said flat surfaces to one another or to said core sheet other than where said stop-off material was applied to form a diffusion bonded sandwich; and
   subjecting said sheets to superplastic forming conditions and thereby expanding said sheets apart against a die.

2. A method as set forth in claim 1, further including;
   forming at least one of said first and second sheets by hot forming said opposite surface thereof against a die and then machining said one surface thereof until it is flat.

3. A method as set forth in claim 1, further including:
   forming at least one of said first and second sheets from a relatively thick sheet having said one flat surface by maintaining said one surface thereof flat while machining said opposite surface thereof to contour it.

4. A method as set forth in claim 1, further including:
   forming at least one of said first and second sheets by hot forming said one surface against a mandrel and them machining said one surface thereof until it is flat.

5. A method as set forth in claim 1, further including:
   forming at least one of said first and second sheets from a relatively thick sheet having said one flat surface by maintaining said one surface thereof flat while chemically milling, electrochemically machining or electrically discharge machining said opposite surface thereof to contour it.

6. A method as set forth in claim 1, further including:
   forming a flat area on said contoured opposite surface of at least one of said first and second sheets prior to subjecting said sheets to diffusion bonding conditions; and
   abutting a flat surface of an additional structural member to said flat area, whereby said flat area is diffusion bonded to said flat surface of said additional structural member during said subjecting of said sheets to diffusion bonding conditions.

7. A hollow structure formed in accordance with the method of claim 6.

8. A hollow structure formed in accordance with the method of claim 1.

9. A method as set forth in claim 1, further including, prior to expanding said sheets apart against said die:
   preinflating said sandwich under superplastic forming conditions to expand said sandwich against a preinflation die to increase the average thickness of the diffusion bonded sandwich no more than about 150 mils and form a preinflated structure.

10. A method as set forth in claim 9 further including, following said preinflating and preceeding said second subjecting step;
    contouring said preinflated structure to a desired shape.

11. A method of forming a hollow structure having a varying mass distribution, comprising:
    forming a first unitary sheet of a diffusion bondable and superplastically formable material with one flat surface and an opposite surface contoured to have a first selected non-uniform mass distribution;
    forming a second sheet of a superplastically formable material that is diffusion bondable to said first sheet with one flat surface and an opposite surface contoured to have a second selected mass distribution, said first and second mass distributions being such as to provide said varying mass distribution for said hollow structure;
    positioning each of said flat surfaces in abutting relation to a respective one of one another and a respective one of a pair of oppositely facing flat surfaces of an intermediate flat core sheet, formed of a material that is diffusion bondable to said first and second sheets and with a stop-off material between selected non-peripheral portions of each of said abutting flat surfaces whereat diffusion bonding is to be prevented and superplastic forming is to be required;
    subjecting said sheets to diffusion bonding conditions to thereby bond said flat surfaces to one another or to said core sheet other than where said stop-off material was applied to form a diffusion bonded sandwich;
    preinflating said sandwich under superplastic forming conditions to expand said sandwich against a first die to increase the average thickness of the diffusion bonded sandwich no more than about 150 mils and form a preinflated structure; and
    thereafter subjecting said preinflated structure to superplastic forming conditions and thereby expanding said sheets apart against a second die to a desired extent.

12. A method as set forth in claim 11, further including, following said preinflating and preceeding said second subjecting step:
    contouring said preinflated structure to a desired shape.

13. A method as set forth in claim 11, further including;
    forming at least one of said first and second sheets by hot forming said opposite surface thereof against a die and then machining said one surface thereof until it is flat.

14. A method as set forth in claim 11, further including:
forming at least one of said first and second sheets from a relatively thick sheet having said one flat surface by maintaining said one surface thereof flat while machining said opposite surface thereof, to contour it.

15. A method as set forth in claim 11, further including:
forming at least one of said first and second sheets by hot forming said one surface against a mandrel and then machining said one surface thereof until it is flat.

16. A method as set forth in claim 11, further including:
forming at least one of said first and second sheets from a relatively thick sheet having said one flat surface by maintaining said one surface thereof flat while chemically milling, electrochemically machining or electrically discharge machining said opposite surface thereof to contour it.

17. A method as set forth in claim 11, further including:
forming a flat area on said contoured opposite surface of at least one of said first and second sheets prior to subjecting said sheets to diffusion bonding conditions; and
abutting a flat surface of an additional structural member to said flat area, whereby said flat area is diffusion bonded to said flat surface of said additional structural member during said subjecting of said sheets to diffusion bonding conditions.

18. A hollow structure formed in accordance with the method of claim 17.

19. A hollow structure formed in accordance with the method of claim 11.

20. A method of forming a hollow structure having a varying mass distribution, comprising:
forming a first unitary sheet of a diffusion bondable and superplastically formable material with one flat surface and an opposite surface contoured to have a first selected non-uniform mass distribution;
forming a second sheet of a superplastically formable material that is diffusion bondable to said first sheet with one flat surface and an opposite surface contoured to have a second selected mass distribution, said first and second mass distributions being such as to provide said varying mass distribution for said hollow structure;
positioning said flat surfaces in abutting relation to one another with a stop-off material between selected non-peripheral portions of each of said abutting flat surfaces whereat diffusion bonding is to be prevented and superplastic forming is to be required;
subjecting said sheets to diffusion bonding conditions to thereby bond said flat surfaces to one another other than where said stop-off material was applied to form a diffusion bonded sandwich; and
subjecting said sheets to superplastic forming conditions and thereby expanding said sheets apart against a die.

* * * * *